United States Patent [19]

Nakagawa et al.

[11] Patent Number: 4,703,898

[45] Date of Patent: Nov. 3, 1987

[54] METHOD FOR PRODUCING ULTRA FINE AND SHORT METAL FIBERS

[75] Inventors: Takeo Nakagawa; Kiyoshi Suzuki, both of Kanagawa, Japan

[73] Assignee: Research Development Corporation of Japan, Tokyo, Japan

[21] Appl. No.: 869,211

[22] Filed: May 30, 1986

[30] Foreign Application Priority Data

Mar. 4, 1986 [JP] Japan .................................. 61-45170

[51] Int. Cl.⁴ ............................................ B02L 19/00
[52] U.S. Cl. ...................................... 241/30; 241/277
[58] Field of Search ......................... 241/30, 277, 280; 51/270, 273

[56] References Cited

U.S. PATENT DOCUMENTS

| | | | |
|---|---|---|---|
| 3,219,283 | 11/1965 | McCulloch et al. | 241/280 X |
| 3,255,070 | 6/1966 | Bersano | 241/280 X |
| 4,351,484 | 9/1982 | Hart | 241/277 X |
| 4,532,736 | 8/1985 | Shinneman, Jr. et al. | 51/273 X |

*Primary Examiner*—Timothy V. Eley
*Attorney, Agent, or Firm*—Michael J. Striker

[57] ABSTRACT

As a grinder is being rotated, an outer circumference thereof and a metal block of raw material are pressed at determined speed or under determined pressure, and the grinder cuts the block on its surface so as to generate short metal fibers of not more than about 15 μm calculated as diameter and not more than about 400 μm in length by contacting between each of abrasive grains held in a matrix of the grinder and the surface of the raw material.

13 Claims, 13 Drawing Figures

FIG_1(a)
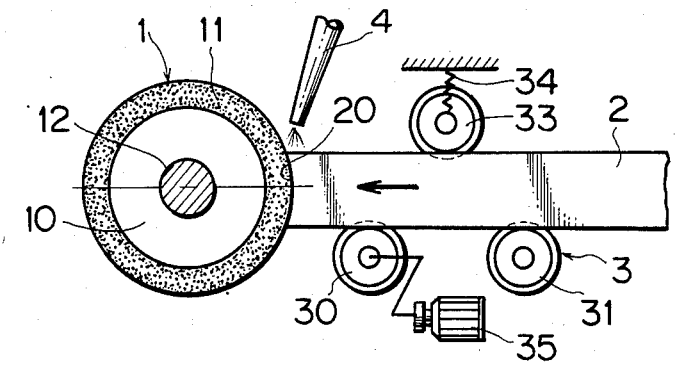
FIG_1(b)
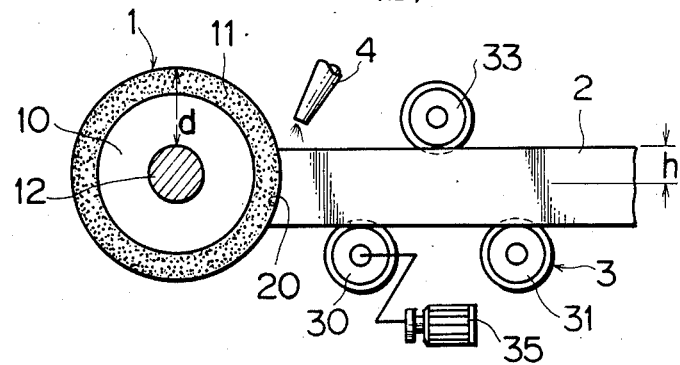
FIG_2
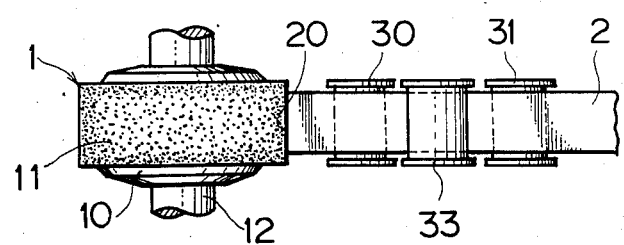

FIG_3
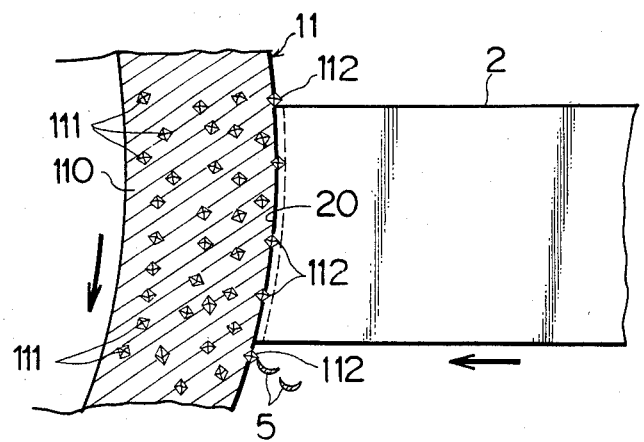
FIG_4
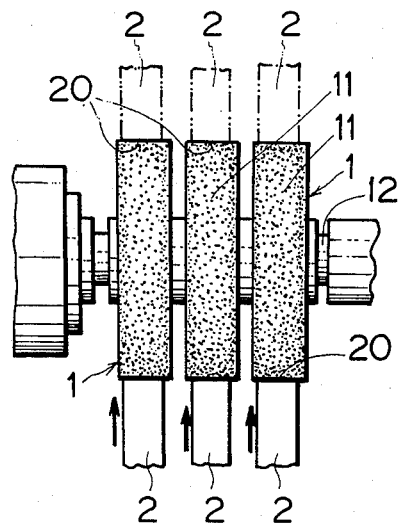
FIG_5(a)
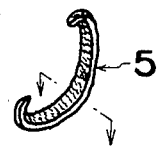
FIG_5(c)
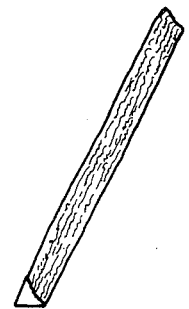
FIG_5(b)
FIG_7
FIG_8
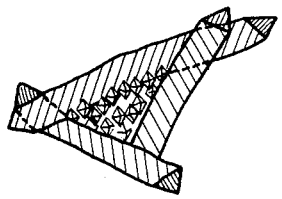

FIG_6(a)
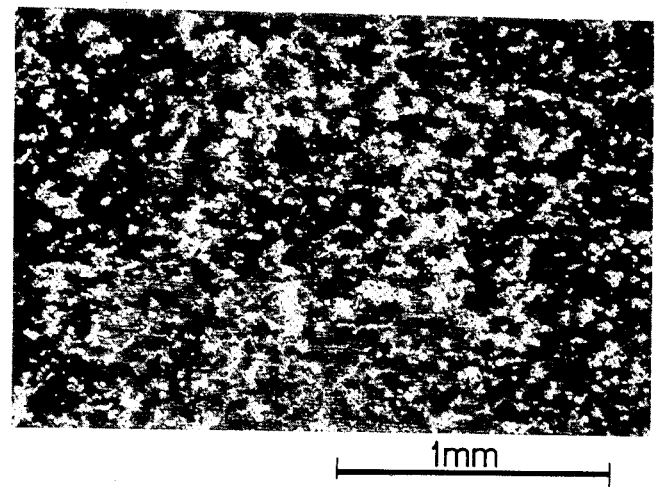
1mm
FIG_6(b)
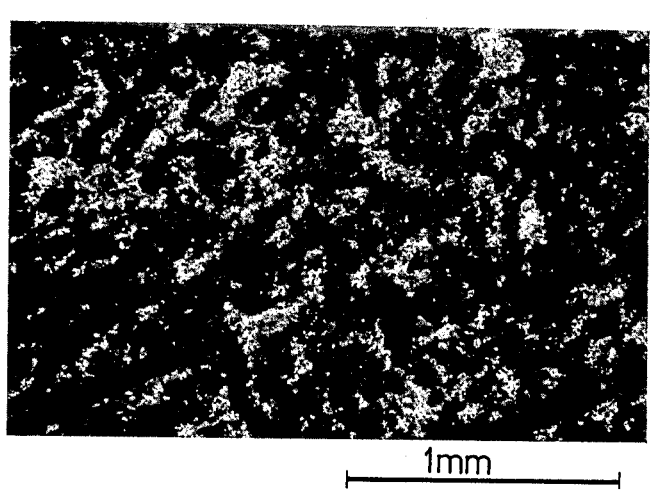
1mm
FIG_6(c)
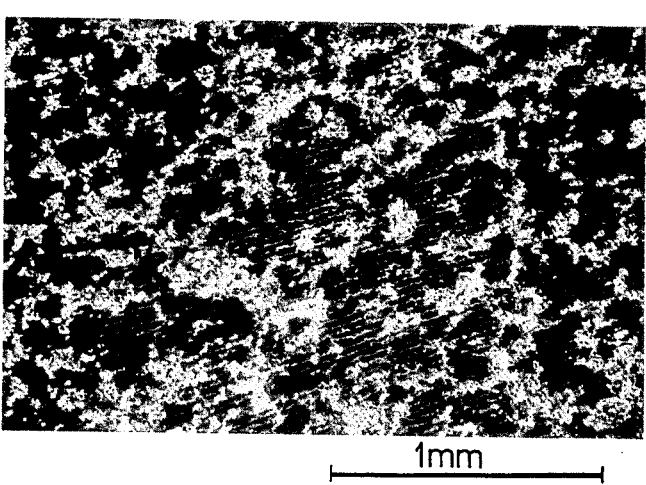
1mm

METHOD FOR PRODUCING ULTRA FINE AND SHORT METAL FIBERS

BACKGROUND OF THE INVENTION

1. [Industrial Application]

The present invention relates to a method for producing metal fibers, and more particularly ultra fine and short metal fibers which are suitable to using as bases of composite materials.

2. [Prior Art and Problems]

The metal fibers have, in comparison with non metallic fibers, excellent properties of high elasticity, bendability, abrasion resistance, electric or heat conductivity, wettability or sintering property, and so they have been used as composite bases for mixing heterogeneous materials.

The metal fibers are generally divided into long and short ones. The former is mainly used to the base of composite material strengthened by fibers for increasing strength of a structure, and the latter is utilized as the base of the composite material strengthened by dispersing grains for aiming at an intermediate nature of strengthening by the fibers and strengthening by the grains.

Metal fibers have been desired to have small cross section as powders for composite and have proper lengths (aspect ratio) and to be mass-produced at low cost because of much use. However there has not been conventionally a method for producing ultra fine and short metal fibers, which was practical for accomplishing desires as said above.

As the fine and short metal fibers and a production therefor, whiskers are known, but as the production is technically difficult and productivity is poor, and its dispersion in liquid substance is not preferable, it has scarcely been used. Another process is extracting the materials from a molten metal, drawing line materials and cutting long fibers into short ones. Depending upon this process, the fibers are fragile and the sizes or physical properties are irregular, and those have not been suitable for using as the base of the composite matreials.

SUMMARY OF THE INVENTION

The present invention has been realized for solving the above mentioned problems.

It is an object of the invention to provide a method for mass-producting ultra fine and short metal fibers at low cost, which can much include and uniformly disperse fine heterogeneous grains, and are excellent in formability, binding force and sintering property, and are desirable as the base of composite materials reinforced by dispersing the graind.

It is another object of the invention to provide a method for mass-producing the above mentioned metal fibers constantly by a simple apparatus.

For accomplishing the objects, the inventors once proposed a method for creating linear and short fibers by machining a block of pillar shape on its surface by means of an elastic tool having a high natural vibration number, by utilizing contacting to and separation from the block due to self-excited vibration of the elastic tool.

This method may easily produce fine and short metal fibers in comparison with each of the above mentioned ones. But since this method makes use of unstable phenemena of "chattering", the apparatus is restrained with respect to precision thereof or rigidity of the products. For this reason, the minimum fibers produced by said method constantly in industrial scale, are about 30 $\mu$m calculated as diameter and about 1 mm in length, and it was difficult to produce smaller fibers than them. Further since the vibration numbers are almost constant, the producing speed rapidly becomes slower as fibers to be produced are made smaller in diameter, so that the cost of fibers is very high.

When the short fibers produced by the self-excited vibration were, as matrix, compounded with heterogeneous grains, problems arose as follows.

(1) Since the fibers had large sizes (length and diameter), dispersion and mixing were not desirable, and limit values (amount and grain diameter) of the mixed heterogeneous grains were fairly inferior.

(2) The heterogeneous grains could not be dispersed finely and uniformly, and especially when their grain diameters were small, spaces of lattice shape were large, and those grains gathered so that maintaining force was lowered.

(3) Since the fibers were linear, acicular and large, they were easily broken or bent by pressure while forming, or the fibers appeared in the surface of the formed products and reduced the outer appearance or product value.

Thus, the inventors have turned over a concept about the prior art. That is, as a grinding stone tool is being rotated, an outer circumference of the tool and a metal block of raw material are pressed at determined speed or under determined pressure, and the grinding tool cuts the block on its surface so as to generate short metal fibers of not more than about 15 $\mu$m calculated as diameter and not more than about 400 $\mu$m in length by contacting between each of abrasive grains held in a matrix of the grinder and the surface of the raw material.

A pressing direction between the block and the outer circumferential part of the grinding tool is carried out in a normal direction, or in a direction having an offsetting amount between centers of the both not reaching until a line-contact therebetween.

The short metal fibers of the invention have, in addition to said sizings, shapes non-linear or curled, irregular in cross section transverse to length and fine wrinkles on the surfaces.

BRIEF DESCRIPTION OF THE DRAWINGS

FIG. 1(a) and FIG. 1(b) are side views showing on principle a method for producing ultra fine and short metal fibers by the invention;

FIG. 2 is a plan view of the above;

FIG. 3 is a partially enlarged view of FIG. 1;

FIG. 4 is a plan view showing another embodiment of the invention;

FIG. 5(a) is a perspective view of one example of 75 magnification of the ultra fine and short metal fibers by the invention;

FIG. 5(b) is a cross sectional view thereof transverse to its length;

FIG. 5(c) is a perspective view of the same magnification of short metal fibers produced by a self-excited vibration process;

FIG. 6 (a) is a photograph of a cross sectional structure of sintered grain composite where the ultra fine and short metal fibers of the invention are a matrix;

FIG. 6(b) is the same where the short fibers by the self-excited vibration are the matrix;

FIG. 6(c) is the same where cast iron powders are the matrix;

FIG. 7 is a schematically enlarged view of composite material with the ultra fine and short metal fibers of the invention; and FIG. 8 is the same using the short metal fibers produced by the self-excited vibration process.

DETAILED DESCRIPTION OF PREFERRED EMBODIMENTS OF THE INVENTION

[Embodiments]

An explanation will be made to an embodiment of the invention with reference to the attached drawings.

FIGS. 1 to 4 show a process for producing ultra fine and short metal fibers in accordance with the present invention, where a grinder device 1 of an optional cross sectional shape is mounted on a main shaft (or an arbor) 12 via a frange 10 and will be rotated by a not shown driving machine.

A grinding stone 11 of the tool 1 secures, as shown in FIG. 3, abrasive grains 111 in a matrix 110. In accordance with properties of fibers to be produced, the abrasive grains are selected from alumina abrasive grains (A-grain), white alundam (WA), silicon carbide abrasive grains (C-grain), green silicon carbide (GC-grain), diamond, cubic boron nitride (CBN), and others. For making ferrous fibers, alumina (WA) and cubic boron nitride (CBN) are desirable, while for making non-ferrous fibers, diamond abrasive grains are good. Grain sizes of the abrasive grains 111 give influences to sizes of fibers, and the smaller grain sizes, the finer fibers are produced.

On the other hand, for the matrix 110, substances without containing resins (non-resinoid bond grinding stone) should be used for reasons that firstly the resinoid bond grinding stone is weak in holding force of the abrasive grains, and the matrix is worm out into plastic powder during production and those powders are mixed in produced fibers and deteriorate shapes and sizes of formed products due to elastic deformation when mixing with heterogeneous grains and being formed under pressure; and secondly the plastic powders are burnt during sintering or induration and invites unnecessary increase of porosities or decrease of strength. For avoiding such problems, resin factors should be removed after having produced the fibers and this work is very troublesome.

From these viewpoints, as the matrix of the grinding stone 11, metals and ceramics are appropriate, and the former is metal bond grinding stone using Cu alloys, cast iron and electrodeposited grinding stones secured with abrasive grains by Ni plating, and the latter is a vitrified stone. Further, a grinding stone bonded with the short fibers of the invention is also effective because the abrasive grains can be uniformly dispersed and the holding force is satisfied.

A numeral 2 is a block of raw material comprising materials desired for producing short metal fibers, and shapes are optional as bar, pillar or disc, and it is preferable that the block 2 has a width smaller than that of the grinding stone (FIG. 2) and a thickness smaller than a diameter of the grinding stone (FIG. 1).

A numeral 3 is a feed device for pressing the block 2 to the outer circumference of the grinder 1. The shown one is provided with a plurality of rollers 30, 31 at its lower part, one of which is connected to a motor 35, and with a presser roller 33 on its upper part via a presser means 34 as a spring. It is sufficient to employ a system which adds moving force in an axial direction from a rear side of the block 3 by such as a cylinder. A numeral 4 is a coolant nozzle.

The present invention produces ultra fine and short fibers by the above mentioned apparatus, where the grinder 1 is rotated at high speed via the main shaft 12, and the feed device 3 is driven to feed the block 2 toward the rotating grinder 1 at the determined speed or under the determined pressure, while a processing liquid is supplied from the coolant nozzle 4 as the block 2 is pressed to the grinding stone 11 at its end 20.

The grinding stone 11 projects the abrasive grains from its surface, and the latter serves as cutting points 112 to the end face 20 of the block 2, as shown in FIG. 3. Each of the cutting points 112 contacts the block 2 and cuts its surface into pieces in parallel to the moving direction of the rotating grinder 1 by a locus length in response to the curvature of the grinding tool 11 and the abrasive grain cutting point 112, and said pieces are effected with shearing plastic deformation and exhausted in the rotating direction of the grinder as short and fine fibers 5 per each of the abrasive grain cutting points.

The pressing between the grinder 1 and the block 2 is preferably carried out in a normal direction aligning in the center line of the grinder 1 to a center in thickness of the block 2 as shown in FIG. 1(a). If required, it is sufficient that the center of the block is offset by "h" from the center of the grinder 1 as shown in FIG. 1(b), providing that the offsetting amount is smaller than a radius of the grinder and does not reach up to the line-contact therebetween, that is, said pressing includes at least partially the end face of the block.

In the shown embodiment, the block 2 is pressed to the grinder 1, but as cases may be, the grinder 1 may be moved toward the block 2 so that the outer circumferential part is pressed to the end of the block 2 or a part including said end of the block 2, providing that the pressing relation in this case should be the same as FIGS. 1(a) or (b).

As the method for producing ultra fine and short metal fibers, it is assumed that a plate shaped block of a raw material is set on a table, and the grinder is rotated at high speed above the block with a certain cutting depth while being fed relatively with the block.

However, this method has a problem that a table mechanism is required for holding the block and a 2 shaft mechanism is necessary for moving the table in X and Y directions, and the block must have holding margin(s) which will reduce yielding of the raw material. Further, this adds a parameter of cutting depth to the conditions of the abrasive grain size, circumferential speed of the grinder and feed speed, so that sizing control of short fibers to be produced is complicated, resulting in much dispersion of the produced fibers.

FIGS. 5(a) and (b) show typical shapes of the fibers 5 of the invention, enlarged by 100 magnification. The fiber has a curvature like a crescent in length, becoming narrow as going to both ends, being small in thickness of cross section transverse to the fiber length, and having fine wrinkles on the surface. The sizes generally have 50 to 400 $\mu$m length, about 20 to 80 $\mu$m width, 2 to 8 $\mu$m thickness and 3 to 15 $\mu$m calculated as diameter.

As is seen, the fibers of the invention are considerably different from a fiber produced by a self-excited vibration system shown in FIG. 5(c) by the same magnification, which is linear in length and triangle in cross section transverse to the fabric length, and has sizes of 500 to 2500 μm length and 30 to 500 μm calculated as diameter.

The fiber sizes (length, width, thickness and radius of curvature) are controlled by one or all of grain size of the abrasive grain, the circumferential speed (or rotating number) of the grinder, and the feed speed (or pressing force) of the block.

For example, if ones of fine grain size are selected for the abrasive grain, short fibers near to the lower limits of size will be obtained. If the circumferential speed or the rotation number of the rotating grinder 1 is heightened, fibers to be produced will be thinner. If the feed speed or the pressing force is increased, they will be thicker. It was found that the conditions for short fibers within said sizes be, in accordance with the experiments, selected from the grain sizes less than #40, the circumferential speed of 500 to 2500 m/min and the feed speed of 1 to 30 mm.

For heightening productivity other than a process where the grinder 11 is made larger in width and a block 2 is made larger in width correspondingly, there are a process where a plurality of grinding stones 11 are, as shown in FIG. 4, arranged coaxially on a shaft 12 and blocks are pressed relatively from a direction shown in FIG. 1(a) or (b) at the determined speed or under the determined pressure, or another process where a plurality of blocks 2, 2 are, as shown with two-dotted lines in the same, arranged symmetrically around the grinding stones 11 and a pressed relatively.

The short metal fibers by the present invention are so fine as not xore than about 15 μm calculated as diameter and not more than about 400 μm in length, and are non-linear in shape having large surface areas.

Therefore, if such fibers are used as composite base materials for mixing heterogeneous materials (grains of one or plural kinds) or as composite materials for heterogeneous short metal fibers, they will display effects as mentioned below.

(1) They have preferable dispersion and fluidity characteristics, and do not segregate when mixing with other grains or fibers and when charging into molds. They may be mixed with many other grains or fibers, and they may uniformly disperse the mixed substances.

(2) They are excellent in formability under relatively low pressure due to said preferable dispersion and fluidity as well as characteristic shapes, so that a degree of formability can be increased and complicated shapes can be easily produced.

(3) They are good in twisting with other fibers and become networked structures having fine air porosities together with said dispersion and fluidity, and they have high strength in spite of much porosity and hinder formation of lamination cracks and defects.

(4) They have combine strongly with others, and since said networked structure is sintered and solidified by heating, it is possible to firmly maintain conditions having uniformly dispersed fine heterogeneous grains.

(5) They are fine in size and not sharp as needles, and they do not appear in outer surfaces of composite products.

Due to the above characteristics, the fibers of the invention may be used as the base materials of composite materials strengthened by dispersing grains, that is, they are suitable to many kinds of grinders represented by metal bonds or self-lubrication sliding material represented by bearings, and as plastic composite materials, to disc break pad, heat resistant or abrasion resistant plastic parts, electromagnetic wave shielding materials, static electricity checking bed or electric wave absorption body, and further as ceramic composite material, to ceramic molds having porous property, heat resistant material of high grade or electric conductive ceramics. Besides, formed or sintered bodies of only fibers can be utilized to porous material or reacting catalysis.

Suitably applied examples of the invention will be explained as follows.

[Metal Bond Grinding Stone Tool]

For accomplishing high processing efficiency of cemented carbides and ceramic materials, it is a premise that the grinder has excellent abilities. The ability of the tool means that maintenance of the abrasive grain in the matrix is satisfied, a grinding ratio may be heightened thereby, numbers of cutting edges are many (high concentration) and notwithstanding the strength of the grinding stone is high, and the grinding efficiency is desirable. These abilities are important especially when the ceramics is undertaken with creep feed grinding by a machining center.

Such abilities are satisfied by the metal bond grinder, for which, it is necessary that the matrix of the grinder increases the abrasive grains much, uniformly and compactly, and the formability and the sintering property are preferable.

If the metal powders were used, for example, cast iron powders, the above conditions could not be satisfied. The metal fibers produced by the self-excited vibration could not bring about desired results for the above reasons.

If the ultra fine and short metal fibers produced by the invention were used as the matrix of the grinding tool, said conditions could be each satisfied by the characteristics (1) to (5), and the ceramic substances can be machined at high efficiency and high operationability.

The grinding tool can be provided by mixing the ultra fine and short metal fibers by the invention with abrasive grains, forming, sintering and burying the abrasive grains in fine networked and small porous lattices by sintering said fibers.

As the ultra fine and short metal fibers, ferrous metals represented by the cast iron are good, Cu alloys are usable and pre-treatment such as sintering may be carried out before mixture. For the abrasive grains, the diamond or CBN are normarily used, and for fillers, glassfrit is used and carbonil iron powder may be added to an iron bond abrasive grains. With respect to forming, a limitation is not especially specified and a metal mold and rolling are employed. The sintering may be performed in an ordinary process, and a re-press may be undertaken during or after the sintering.

The fibers of the invention may be widely used to machining or grinding other than the abrasive grinding stones.

[Self-Lubrication Sliding Material of Sintered Type]

Concerning sliding materials represented by sliding bearings, there is a self-lubrication sliding material of sintered type where solid lubricants such as carbon or molybdenum disulfide are dispersed in a matrix. For improving functions of this sliding material, it is necessary to increase the content of the solid lubricant uniformly dispersed and heighten mechanical strength thereof.

If the fibers of the invention are mixed with the solid lubricant, formed and sintered, such sliding materials will be obtained where the solid lubricant is much and unifromly dispersed in the lattices of fine network and small porosities by sintering the ultra fine and short metal fibers.

For the fibers, are used the ferrous metal represented by the cast iron, Cu-alloys of bronse and brass, or Al-alloys of duralumin. Graphite or molybdenum disulfide are used for the solid lubricant. Other processing conditions are the same as in the abrasive grains.

EXAMPLE 1

I. As the grinder for producing the fibers, were used (A) a grinding tool having the outer diameter of 150 mm and the width of 30 mm fixed with the cubic boron nitride by Ni plating, and (B) a vitrified grinding tool of white alundum having the outer diameter of 150 mm and the width of 20 mm. The abrasive grains of the tools were #80 and #54.

The blocks of the raw materials were the square materials of ductile cast irons (FCD-50) having the thickness 24 mm, width 18 mm and length 1000 mm, and the processing liquid was the aqueous machining liquid.

II. The grinder was rotated by the main shaft, and the block was fed by the feed device of FIG. 1(a) toward the outer circumferential part of the grinder from the normal direction.

The producing conditions and several examples of the products are as follows.

a. In the grinding tool (A) of grain size #80, circumferential speed 750 m/min, feed speed 2.8 mm/min, length 150 μm and calculated size as diameter 8 μm b. In the grinding tool (B) of grain size #80, circumferential speed 750 m/min, feed speed 12 mm/min, length 200 μm and calculated size as diameter 11 μm c. In the grinding tool (B) of grain size #54, circumferential speed 750 m/min, feed speed 2 mm/min. length 300 μm and calculated size as diameter 13 μm d. In the grinding tool (B) of grain size #80, circumferential speed 750 m/min, feed speed 15 mm/min, length 200 μm and calculated size as diameter 11 μm e. In the grinding tool (B) of grain size #80, circumferential speed 1500 m/min, feed speed 15 mm/min, length 300 μm and calculated size as diameter 8 μm.

III. Characteristics of the obtained fibers were studied with the above sample a. The experiments were made by mixing the under grains in the above fibers, forming in a metal mold under the surface pressure of 8 ton/cm$^2$, making a tubular body of the outer diameter 30 mmφ, inner diameter 15 mmφ and thickness 10 mm, and sintering it 1140° C.×30 min in the H$_2$ atmosphere. Grains: carbonyl iron powders (23 wt % of the mother)
Abrasive grains: WA (#120, 400, 800)
Concentration:
  100 (15 Wt %, 25 vol %)
  200 (34.7 wt %, 50 vol %)
  300 (61.5 wt %, 75 vol %)

For comparison, as the matrix, were used fibers by the chattering vibration machining (self-excited vibration number 5000 Hz, cutting speed 100 m/min and feed 3.1 μm/rev) of the length 1.2 mm and calculated size as diameter 32 μm, and cast iron grains (FC20, #120), and the experiments were made under the same conditions.

Concentrations, porosities and pressures in #400 are as follows.

|  | Concentration | Porosity (%) | Pressure (Kgf/mm$^2$) |
| --- | --- | --- | --- |
| Fibers of | 100 | 12.6 | 59.2 |

|  | Concentration | Porosity (%) | Pressure (Kgf/mm$^2$) |
| --- | --- | --- | --- |
| Invention | 200 | 17.8 | 25.3 |
|  | 300 | 20.0 | 3.5 |
| Fibers of | 100 | 13.2 | 52.1 |
| self-excited | 200 | 19.0 | 18.4 |
| vibration | 300 | 25.9 | 2.8 |
| Cast iron | 100 | 16.2 | 32.5 |

The matrix of the iron cast powder was caused with the lamination cracks at the concentration of 200, and the limit was the concentration of 100.

The abrasive grains of #120 were mixed to have the concentration 200, and the maximum formed heights were tested. As a result, the matrixes were 58 mm in the present fibers, 46 mm in the fibers of the self-excited vibration and 33 mm in the cast iron powders. Cross sectional structures of the sintered bodies obtained from the matrixes of #400 abrasive grains and concentration 200 were shown by the electronic microscope of 50 magnification, and FIG. 6(a) is of this invention, FIG. 6(b) is of the self-excited vibration and FIG. 6(c) is of the cast iron powders. Changes in size (diameter of sintered body−diameter of formed body/diameter of formed body) of the concentrations 100 and 200 of the invention were −1.89% (concentration 100) and −1.25% (concentration 200).

For the above mentioned it is seen that the fibers of the invention are excellent in formability and the sintering property, the grinder having a large width can be produced, strength to pressure on circle is high in spite of the high porosities and the abrasive grains can be much mixed. Further on, FIGS. 6(a) to (c) show that the dispersion of grains is fairly well conditioned in comparison with other matrix, so that the grinder is suitable to holding the grains.

With respect to the air porosity, it could be reduced to an extent of the cast iron powder by performing the sintering in the N$_2$ atmosphere 800° C.×1 hr.

IV. Based on the above mentioned results, the grinder of the cast iron bond with a shaft and the straight grinder were made on the base of the fibers of the invention.

Grinder With Shaft

Size: 30 mmφ, thickness in radius: 7.5 mm
Matrix: a fiber (annealing treatment)
Filler: carbonyl iron powder 23 wt %
Abrasive grain: diamond #100/200
Concentrations: 100, 150, 200

Straight Grinder

Size: 150 mmφ, thickness in radius: 2.5 mm
Matrix: a fiber (non-annealed)
Filler: carbonyl iron powder 31 wt %
Abrasive grain: diamond #100/200
Concentration: 100

Producing Conditions

The matrix, filler and abrasive grains were mixed in the ball mill, formed in the metal mold under the surface pressure of 8 ton/cm$^2$.

V. The obtained grinders were subjected to the machining experiments for studying the machining characteristics.

Elements of the experiments are as follows.

Materials to be processed: silicon carbide sintered under normal pressure (Hv 1700)
500 mm □ × thickness 200 mm
Machining conditions
  Speed: v=211 to 1055 m/min
  Feed: F=20 to 4000 mm/min
  Depth: F=0.5 to 3.0 mm
  Width: W=1.0 to 3.0 mm
  Direction: Down-cut
Machine: Vertical machining centre VI. Machining results by the grinder with the shaft The creep feed machining was carried out under V=211 mm/min, W=3 mm, Z=3 mm and F=20, 40 mm/min. Removal amount Q was 180 mm$^3$ under F=20 mm/min, and 360 mm under F=40 mm/min. Although the grinder had the small diameter and the machining speed was very low, a satisfactory heavy machine was accomplished.

The machining ratios GR were 1790 under F=20 mm/min and 880 under F=40 mm/min. They are high values in view of the natures of the materials under processing, because the holding force of the abrasive grains is strong.

As to the feed speed, the experiments were done up to L=1700 mm, and the machining resistance showed saturation around L=700 mm, from which, it is seen that the cutting durability is excellent and the machining is possible for a long period of time without using dressing.

Other experiments were carried out with the grinders of the concentrations being 150 and 200 under the same conditions and big differences were little found.

VII. Machining results by the straight grinder

Possibility of the high efficient machining was confirmed with this grinder. The machining speed was set V=1050 mm/min under W=2 mm and Z=0.5 mm and feed speed of F=3000 mm/min.

The removal amount at this time was as much as Q=3000 mm$^3$/min (1500 mm$^3$/mm/min). Although the conditions were severe, the machining resistance was relatively low as Fv=14 kgf/mm and Fh=2.7 kgf/mm, and the machining was stable for a long period of time (total machining length L=9500 mm). The machining ratio was about 892 and this was very high in view of the heavy maching conditions.

The creep feedmachining was performed with the large cutting depth of V=1050 m/min (z=3 mm, W=3 mm, F=42 mm/min and Q=378 mm$^3$/min). The grinder was not broken by high force of 254 kgf.

From the above results, it is seen that grinders may be produced which have excellent machining characteritcs with high concentration of the abrasive grains of small size.

EXAMPLE 2

Sliding bearings were made with the fibers a of EXAMPLE 1 of outer diameter 30 mm$\phi$, inner diameter 15 mm$\phi$ and height 15 mm. The solid lubricant was graphite #250.

The producing conditions were addition of 20 to 30 wt % graphite, mixing for 60 minutes, and press forming under the pressure 8 kg/mm$^2$, and sintering for 30 minutes in the H$_2$ atmosphere of 1140° C. Test pieces were made from the obtained sliding bearings and the compression test was made. The compression strength was 50 kg/mm$^2$ at addition of 10 wt %, 20 kg/mm$^2$ at addition of 20 wt % and 17 kg/mm$^2$ at addition of 30 wt %.

For comparison, powders #120 of iron cast of FC20 grade could be, under the same condition, shaped into sliding bearings somehow with addition of graphite 20 wt %, but could not be sintered. When the fibers produced by the chattering vibration were used, they were equal in strength, but when they were used under the conditions of contacting pressure of more than 3 kgf/cm$^2$ and speed exceeding 60 m/min, they were inferior about 30% in abrasion and about 20% in friction coefficient in comparison with the present invention.

This is why the fibers of the invention are excellent not only in combining force but also in dispersion, so that graphite powders are much dispersed uniformly.

In accordance with the invention, it is possible to produce ultra fine and short metal fibers which can much include heterogeneous grains uniformly, and are excellent in formability, and combining force, and suitable to the base of composite material strengthened by dispersing the grains.

What is claimed is:

1. A method for producing short metal fibers as a base of composite materials reinforced by dispersing grains, representing a metal bond grinding stone tool or self-lubricating sliding material of a sintered type, comprising:

rotating a grinder at a circumferential speed of 500 to to 2500 m/min, the grinder having a surface on which abrasive grains are fixedly held in a non resin bond matrix under grain conditions in which each of the abrasive grains is of a size less than #40, the non resin bond matrix with abrasive grains constituting a grinding part with a surface, the abrasive grains constituting cutting edges projecting from the surface of the grinding part, the grinder having a diameter and a curvature;

continuously pressing an end portion of a block in a direction normal to the rotating grinder so as to provide a feeding speed of 1 to 30 mm/min, the block constituting raw material and having a width less than the width of the grinder part and having a thickness less than the diameter of the grinder;

cutting a surface layer of the end portion of the block with each of the cutting edges projecting from the surface of the grinding part so as cut the surface layer into pieces per each of the cutting edges of the abrasive grains along a locus length corresponding to the curvature of the rotating grinder so as to effect a shearing plastic deformation of the pieces and so that each of the pieces is not more than 400 micrometers in length and not more than 15 micrometers in diameter and so that each of the pieces has a surface with fiber length from end to end and a cross-sectional thickness transverse of the fiber length having a crescent-shaped curvature and has wrinkles on the surface of each of the pieces; and discharging the pieces per each of the cutting edges of the abrasive grains thereby as short and fine fibers produced in dependence upon the previously mentioned grain conditions, circumferential speed of the grinder, and feeding speed and direction of the raw material with respect to the grinder.

2. A method as claimed in claim 1, wherein the metal block is pressed to the grinder under determined pressure.

3. A method as claimed in claim 1, further comprising:

arranging a plurality of the grinding parts coaxially on a shaft; and pressing end portions of a plurality of blocks against the grinding parts so that each end portion of the blocks presses in a direction normal to a respective one of the grinding parts at the feeding speed, the blocks constituting the raw material.

4. A method as claimed in claim 3, wherein said pressing is carried out under determined pressure.

5. A method as claimed in claim 4, wherein said pressing is carried out so that all of the blocks simultaneously press against the respective grinding parts.

6. A method as claimed in claim 1 further comprising:

controlling sizes of the fiber by at least one of grain size of the abrasive grain, circumferential speed of the grinder, and feed speed of the block.

7. A method as claimed in claim 6, wherein the controlling includes controlling said sizes of the fiber by all of said grain size, circumferential speed, and feed speed.

8. A method as claimed in claim 7, wherein said abrasive grains are selected from alumina abrasive grains, white alundum, silicon carbide abrasive grains, green silicon carbide, diamond, and cubit boron nitride.

9. A method as defined in claim 1, wherein said non resin matrix is selected from the group consisting of metals and ceramics.

10. A method as defined in claim 9, wherein the metals are selected from the group consisting of Cu alloys, cast iron and Ni-plating.

11. A method as defined in claim 9, wherein the ceramics are formed as vitrified stone.

12. A method as defined in claim 9, wherein the metals are formed as metal fibers having a length no more than 400 micons and a diameter no more than 15 microns.

13. A method as defined in claim 1, wherein the providing includes uniformly distributing the abrasive grains throughout the non resin matrix.

* * * * *